United States Patent [19]
Frater et al.

[11] Patent Number: 6,112,400
[45] Date of Patent: Sep. 5, 2000

[54] APPARATUS AND METHOD FOR ADHESIVELY CONNECTING WIRES TO A SUSPENSION ARM IN A DISK DRIVE ASSEMBLY

[75] Inventors: Norman Kermit Frater, San Jose; Gary Lee Heitkamp, Morgan Hill; Hsuehmin Li, Milpitas; Diane Sprandel O'Regan, Los Gatos; Rudy Vadillo, Gilroy, all of Calif.

[73] Assignee: International Business Machines Corporation, Armonk, N.Y.

[21] Appl. No.: 09/126,611

[22] Filed: Jul. 31, 1998

Related U.S. Application Data

[62] Division of application No. 08/912,499, Aug. 18, 1997, Pat. No. 5,808,836, which is a continuation of application No. 08/520,995, Aug. 30, 1995, abandoned.

[51] Int. Cl.⁷ ................................................. G11B 5/127
[52] U.S. Cl. ................................. 29/603.03; 29/603.06
[58] Field of Search ........................... 29/603.04, 603.05, 29/603.06, 603.03

[56] References Cited

U.S. PATENT DOCUMENTS

| | | | |
|---|---|---|---|
| 3,931,641 | 1/1976 | Watrous | 360/104 |
| 4,167,765 | 9/1979 | Watrous | 360/103 |
| 4,384,299 | 5/1983 | Raffel et al. | 357/23 |
| 4,807,054 | 2/1989 | Sorensen et al. | 360/104 |
| 4,853,811 | 8/1989 | Brooks, Jr. et al. | 360/103 |
| 4,868,694 | 9/1989 | Hagen | 360/104 |
| 4,884,154 | 11/1989 | Onodera et al. | 360/104 |
| 4,937,693 | 6/1990 | Connolly et al. | 360/106 |
| 4,991,045 | 2/1991 | Oberg | 360/104 |
| 4,996,616 | 2/1991 | Aoyagi et al. | 360/104 |
| 4,996,623 | 2/1991 | Erpelding et al. | 360/104 |
| 5,001,583 | 3/1991 | Matsuzaki | 360/104 |
| 5,003,420 | 3/1991 | Hinlein | 360/104 |
| 5,012,368 | 4/1991 | Bosier et al. | 360/104 |
| 5,060,100 | 10/1991 | Mihara et al. | 360/106 |
| 5,063,464 | 11/1991 | Astheimer et al. | 360/104 |
| 5,074,029 | 12/1991 | Brooks, Jr. et al. | 29/603.03 |
| 5,103,359 | 4/1992 | Marazzo | 360/104 |
| 5,138,507 | 8/1992 | Zarouri et al. | 360/104 |
| 5,172,286 | 12/1992 | Jurgenson | 360/104 |
| 5,208,712 | 5/1993 | Hatch et al. | 360/98.01 |
| 5,282,103 | 1/1994 | Hatch et al. | 360/104 |

(List continued on next page.)

FOREIGN PATENT DOCUMENTS

| | | |
|---|---|---|
| 0442225A2 | 8/1991 | European Pat. Off. . |
| 0484906A2 | 5/1992 | European Pat. Off. . |
| 1-213821 | 8/1989 | Japan . |
| 4-276306 | 10/1992 | Japan ..................................... 360/104 |
| 2193833A | 2/1988 | United Kingdom . |

OTHER PUBLICATIONS

A. Aoyagi, K. Satoh and K. Takahashi, Integrated Head Suspension Assembly, *IBM Technical Disclosure Bulletin*, vol. 32, No. 3A, Aug. 1989, pp. 175–176.

W. W. Brooks, Jr. and J. H. Wirz, Rework Feature For An Actuator Assembly, *IBM Technical Disclosure Bulletin*, vol. 33, No. 10B, Mar. 1991, pp. 392, 393.

K. H. Elser and R. B. King, Integrated Arm–Head Suspension For Magnetic Disk Files, *IBM Technical Disclosure Bulletin*, vol. 31, No. 12, May 1989, pp. 203–204.

*Primary Examiner*—Lee Young
*Assistant Examiner*—Kevin G. Vereene
*Attorney, Agent, or Firm*—Gray Cary Ware Freidenrich

[57] ABSTRACT

A head suspension assembly including a load beam having predefined gluing regions for gluing a bundle of wires thereto. For each gluing region, the load beam is partially-etched with the pattern that includes a plurality of grooves. Preferably, the pattern within the gluing region includes a set of parallel grooves. The gluing regions can be formed at very little cost because partial etching can be performed simultaneously etching other features on the load beam. Advantageously, the gluing regions provide enhanced adhesion between the wires and the load beam which reduces the possibility of failure during manufacture, thereby reducing costs.

3 Claims, 6 Drawing Sheets

U.S. PATENT DOCUMENTS

| | | | |
|---|---|---|---|
| 5,333,085 | 7/1994 | Prentice et al. | 360/104 |
| 5,353,181 | 10/1994 | Frater et al. | 360/104 |
| 5,353,182 | 10/1994 | Nakamura et al. | 360/104 |
| 5,442,504 | 8/1995 | Nagase et al. | 360/104 |
| 5,499,153 | 3/1996 | Uemura et al. | 360/104 |
| 5,570,261 | 10/1996 | Frater et al. | 360/104 |
| 5,606,477 | 2/1997 | Erpelding et al. | 360/104 |
| 5,682,669 | 11/1997 | Harrison et al. | 29/603.06 |
| 5,711,063 | 1/1998 | Buddle et al. | 29/603.06 |
| 5,771,568 | 6/1998 | Gustafson | 29/603.06 |
| 5,812,342 | 9/1998 | Khan et al. | 360/104 |
| 5,815,349 | 9/1998 | Frater | 360/104 |
| 5,879,570 | 4/1999 | Hagen | 216/22 |
| 5,930,080 | 7/1999 | Frater et al. | 360/104 |
| 5,991,118 | 11/1999 | Kaamatsu et al. | 360/103 |

APPARATUS AND METHOD FOR ADHESIVELY CONNECTING WIRES TO A SUSPENSION ARM IN A DISK DRIVE ASSEMBLY

CROSS-REFERENCE TO RELATED APPLICATIONS

This application is a division of Ser. No. 08/912,499 filed Aug. 18, 1997 now U.S. Pat. No. 5,808,836 which is a continuation of Ser. No. 08/520,995 filed Aug. 30, 1995 now abandoned.

The invention is related to the following commonly-assigned patent:

U.S. Pat. No. 5,074,029, Method for Stringing Wire on an Actuator Arm, by Brooks, Jr. et al. issued Dec. 24, 1991.

BACKGROUND OF THE INVENTION

1. Field of the Invention

This invention relates generally to transducer suspension systems for magnetic recording media, and more particularly to electrical connections to a transducer head.

2. Description of the Related Art

Direct access storage devices (DASD) such as disk drives store information on concentric tracks of a rotatable magnetic recording disk. A magnetic head or other transducer element is moved from track to track to read or record the desired information. Typically, the magnetic head is positioned on an air-bearing slider which "flies" off of the surface of the disk as the disk rotates. A head suspension assembly connects the slider to a rotary or linear actuator. The head suspension assembly provides support for the slider while allowing it to gimbal during operation in order to adjust its orientation as appropriate.

The head suspension assembly typically comprises a load beam attached to an actuator arm, a flexible member (known as a flexure) attached to the load beam, and a slider attached to the flexure.

Examples of suspension systems are shown in the following references:

U.S. Pat. No. 5,208,712, issued May 4, 1992; U.S. Pat. No. 5,172,286, issued Dec. 15, 1992; U.S. Pat. No. 5,138,507, issued Aug. 11, 1992; U.S. Pat. No. 5,074,029, issued Dec. 24, 1991; U.S. Pat. No. 5,063,464, issued Nov. 5, 1991; U.S. Pat. No. 5,012,368, issued Apr. 30, 1991; U.S. Pat. No. 5,003,420, issued Mar. 26, 1991; U.S. Pat. No. 5,001,583, issued Mar. 19, 1991; U.S. Pat. No. 4,996,623, issued Feb. 26, 1991; U.S. Pat. No. 4,996,616, issued Feb. 26, 1991; U.S. Pat. No. 4,991,045, issued Feb. 5, 1991; U.S. Pat. No. 4,937,693, issued Jun. 26, 1990; U.S. Pat. No. 4,853,811, issued Aug. 1, 1989; U.S. Pat. No. 4,884,154, issued Nov. 28, 1989; U.S. Pat. No. 4,868,694, issued Sep. 19, 1989; U.S. Pat. No. 4,807,054 issued Feb. 21, 1989; U.S. Pat. No. 4,167,765, issued Sep. 11, 1979; U.S. Pat. No. 3,931,641, issued Jan. 6, 1976; European Patent Application 484,906, published May 13, 1992; European Patent Application 442,225, published Aug. 21, 1991; Japanese Patent Application 01-213821, published Aug. 28, 1989; UK Patent Application 2,193,833, published Feb. 17, 1988; IBM Technical Disclosure Bulletin Vol. 33, No. 10B, March 1991, page 392; IBM Technical Disclosure Bulletin Vol. 32, No. 3A, August 1989, page 175; and IBM Technical Disclosure Bulletin Vol. 31, No. 12, May 1989, page 203.

In order to electrically connect the transducer head with a read/write controller for the a disk drive unit, very thin electrical wires are run across the suspension assembly. One conventional type of suspension assembly, such as that disclosed in U.S. Pat. No. 5,012,368 to Bosier et al., includes a fine tube through which the wires pass to the transducer head. Other suspension assemblies, such as disclosed in U.S. Pat. No. 5,001,583 to Matsuzaki, are manufactured with the wires embedded in the load beam.

Some suspension assemblies pass the wires directly over the load beam, without using a tube that disadvantageously increases weight and affects flexing. This type of suspension assembly is disclosed in U.S. Pat. No. 5,074,029 to Brooks, Jr. et al, entitled "Method for Stringing Wire on an Actuator Arm." As disclosed therein, the load beam is attached to a plastic tail (which is eventually discarded) and affixed to a tooling assembly. The wires are positioned across the load beam and tensioned using a tensioning device on the tooling assembly. A series of glue dots are then applied to adhesively connect the wires to the load beam. Particularly, uv-curable glue is deposited in dots at predetermined locations along the tensioned wires, and the glue dots are then exposed to uv light. After the glue has cured, the wires are ultrasonically bonded to the transducer, cut and formed into a loop, thereby causing a tension imbalance at the glue dot closest to the cut. One problem with this gluing technique is that the glue dot closest to the transducer head sometimes pulls away from the load beam due to the tension imbalance, rendering the part unusable. The glue dots are subjected to further stress during subsequent cleaning in an ultrasound bath in which the part is shaken. Additionally, the water in the bath causes the glue to swell, which can also contribute to failure of the glue dot. Furthermore, the glue dot on the other side (i.e. the glue dot closest to the actuator arm assembly) sometimes pulls away due to unpredictable thermal expansion differences between plastic and metal.

For these and other reasons, a good adhesive bond at the glue dot is essential for efficient and cost effective manufacturing. One proposed solution could be to use larger glue dots; however, there are several problems associated with large glue dots. Glue application can be unpredictable: liquid glue tends to "wick" along the wire and to spread to unwanted locations rather than remain in the desired location, causing difficulties in quality control. Uncontrolled spreading increases the probability that a part will be unusable. Furthermore, a larger glue dot is more susceptible to thermal expansion stresses. And, glue wicking could cause the thin wires to be too stiff and adversely affect performance. Additionally, due to requirements for close spacing between disks in modem disk drives, the greater height of such a larger glue dot could cause the thickness of the suspension assembly to cause difficulties during merge of the suspension assemblies into the disk stack.

Another proposed solution to the adhesion problem could be to use a greater number of small dots. However, this approach increases manufacturing costs by increasing the time it takes to manufacture a part, and therefore is not an acceptable solution. It would be an advantage to provide a system for predictably and effectively gluing the wires to a load beam using only a few glue dots.

SUMMARY OF THE INVENTION

In accordance with the objectives of this invention as described above and to overcome the limitations of the prior art, a head suspension assembly having predefined gluing regions and a method for gluing wires to a head suspension assembly, and particularly for gluing wires to a load beam, is provided. Broadly speaking, the load beam is half-etched with a pattern that includes a plurality of grooves at the position where the wires are to be glued. Preferably the pattern includes a set of parallel grooves. Advantageously, the pattern can be obtained at very little additional cost because etching the grooves can be performed simultaneously with etching other features on the load beam.

Gluing the wire to the grooved pattern in the gluing region provides better adhesion than the previous practice of gluing the wire to a smooth surface. Furthermore, during glue application, the grooves allow the glue to flow in a more controlled manner, preventing undesirable flowing and wicking of glue beyond the desired gluing region into other areas. These advantages, and others, result in reduced adhesion failures during manufacture at little or no additional cost, and thereby provide a cost effective way of manufacturing suspension assemblies. Additionally, the enhanced adhesion reduces the possibility of failure during operation of the disk drive unit in which it is installed.

The foregoing, together with other objects, features and advantages of this invention, will become more apparent when referring to the following specification, claims and the accompanying drawings.

BRIEF DESCRIPTION OF THE PREFERRED EMBODIMENTS

For a more complete understanding of this invention, reference is now made to the following detailed description of the embodiments as illustrated in the accompanying drawing, wherein.

DETAILED DESCRIPTION OF THE PREFERRED EMBODIMENTS

This invention is described in a preferred embodiment in the following description with reference to the Figures, in which like numbers represent the same or similar elements. While this invention is described in terms of the best mode for achieving this invention's objectives. It will be appreciated by those skilled in the art that variations may be accomplished in view of these teachings without deviating from the spirit or scope of the invention.

Figure 1:
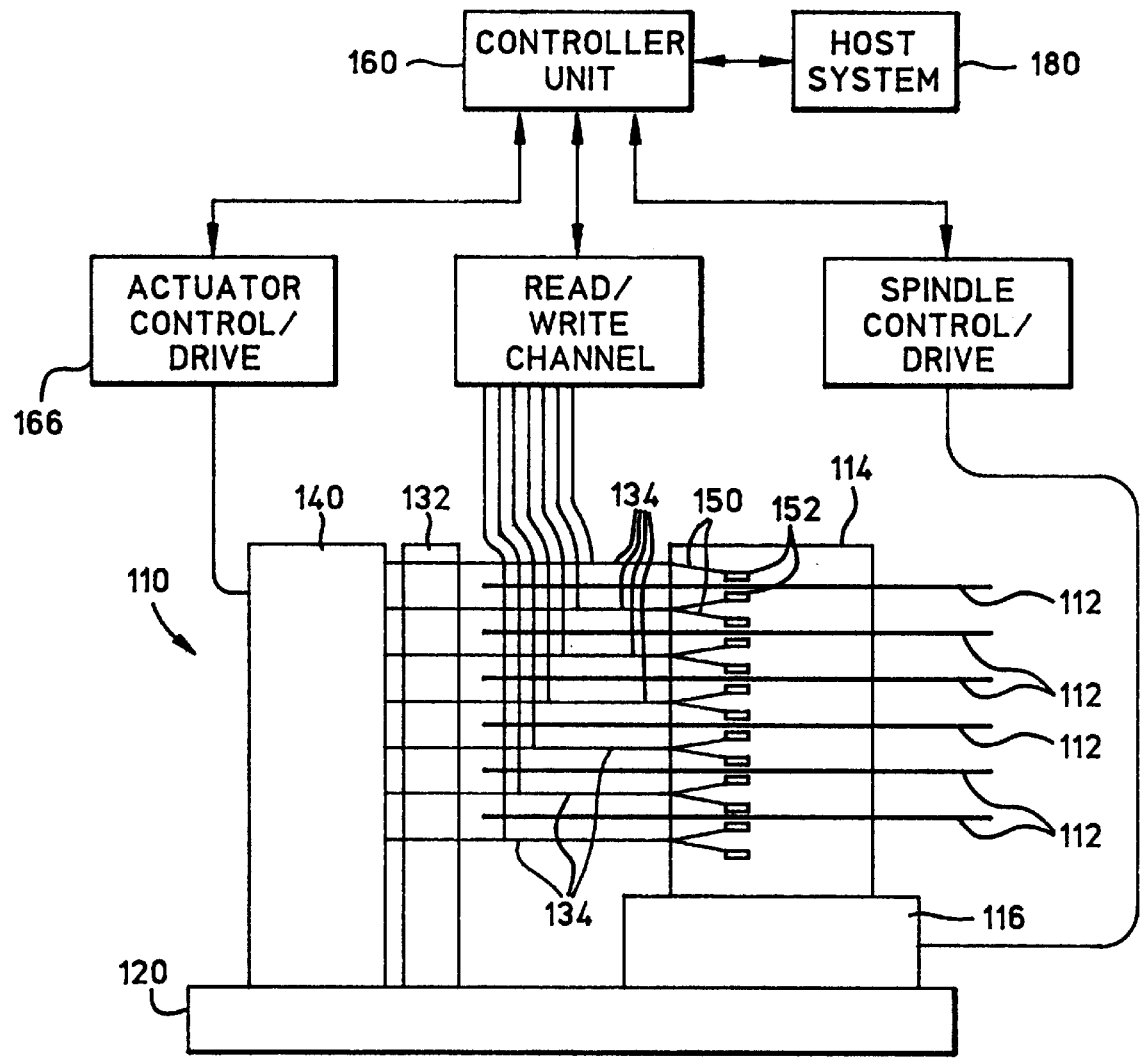
FIG. 1 is a side view of a disk drive system and a controller unit in block form.
Figure 2:
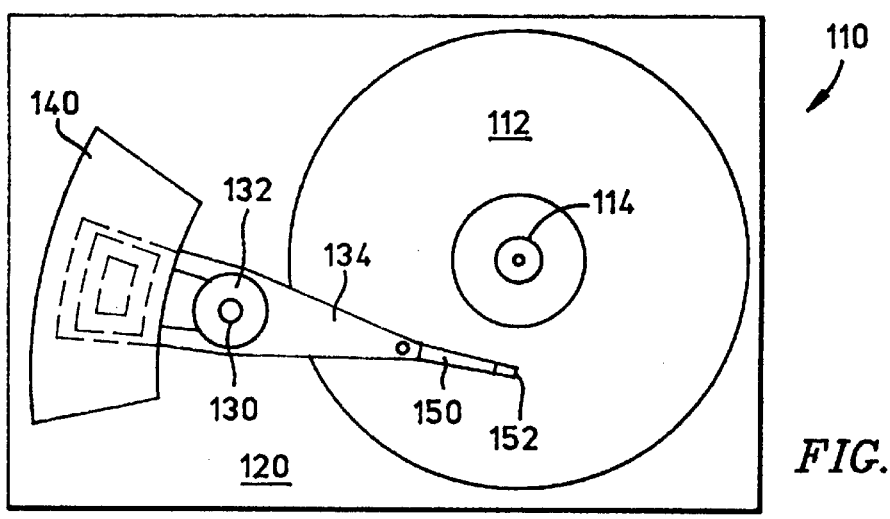
FIG. 2 is a top view of a disk drive system.

FIGS. 1 and 2 show a side and a top view, respectively, of a disk drive system designated by the general reference number 110. The disk drive system 110 comprises a plurality of stacked magnetic recording disks 112 mounted to a spindle 114. The disks 112 may be conventional particulate or thin film recording disks or, in other embodiments, they may be recently proposed liquid bearing disks. The spindle 114 is attached to a spindle motor 116 which rotates the spindle 114 and disks 112. A chassis 120 provides a housing for the disk drive system 110. The spindle motor 116 and an actuator shaft 130 are attached to the chassis 120. A hub assembly 132 rotates about the actuator shaft 130 and supports a plurality of actuator arms 134. The stack of actuator arms 134 is sometimes referred to as a "comb". A rotary voice coil motor 140 is attached to chassis 120 and to a rear portion of the actuator arms 134.

A plurality of head suspension assemblies 150 are attached to the actuator arms 134. A plurality of transducer heads 152 are attached respectively to the suspension assemblies 150. The heads 152 are located proximate to the disks 112 so that, during operation, they are in electromagnetic communication with the disks 112 for reading and writing. The rotary voice coil motor 140 rotates actuator arms 134 about the actuator shaft 130 in order to move the head suspension assemblies 150 to the desired radial position on disks 112. The shaft 130, hub 132, arms 134, and motor 140 may be referred to collectively as a rotary actuator assembly.

A controller unit 160 provides overall control to system 110. Controller unit 160 typically includes (not shown) a central processing unit (CPU), a memory unit and other digital circuitry, although it should be apparent that these aspects could also be enabled as hardware logic by one skilled in the computer arts. Controller unit 160 is connected to an actuator control/drive unit 166 which in turn is connected to the rotary voice coil motor 140. This configuration allows controller 160 to control rotation of the disks 112. A host system 180. Typically a computer system, is connected to the controller unit 160. The host system 180 may send digital data to the controller 160 to be stored on disks 112, or it may request that digital data at a specified location be read from the disks 112 and sent to the system 180. The basic operation of DASD units is well known in the art and is described in more detail in *Magnetic Recording Handbook,* C. Dennis Mee and Eric D. Daniel, McGraw-Hill Book Company, 1990.

Figure 3:
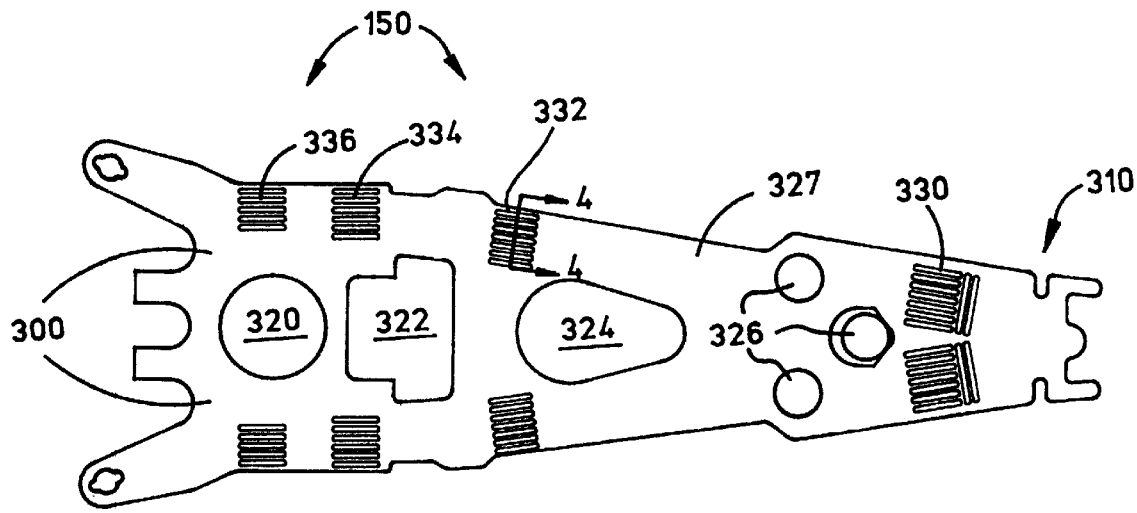
FIG. 3 is a top view of a load beam including gluing regions having sets of parallel grooves for the preferred embodiment.

Reference is now made to FIG. 3 which is a top view of a load beam 150 in one preferred embodiment. The load beam 150 comprises a base section 308 and opening 320 for connection to the actuator arms 134 (FIGS. 1 and 2). Any suitable means may be utilized. For example, a support plate (not shown) may be positioned opposite an arm 134 and the base section 300 in order to provide a good support for connecting a load beam 150 to the arm 134. The support plate is preferably made of a rigid material such as stainless steel, and attaches to the arm by a swage connection through opening 320 and into an opening in the arm 134 or an equivalent attachment. The support plate and the load beam 150 may be attached together by a plurality of welds.

The load beam 150 includes, on the end opposite the tabs 300, a tip 310 including any suitable means for attaching to a transducer head. Alternatively, the tip 310 may be attached to a flexure which is connected to a transducer head. The means for attaching a load beam to a transducer head is not essential to the invention, and will not be discussed in detail The load beam 150 includes a plurality of holes 320, 322, 324 and 326. These holes, and others illustrated, are formed into the load beam for purposes including tooling and controlling the flex of the load beam.

The load beam 150 is an elongate member with upper and lower surfaces. The upper surface 327 includes a plurality of gluing regions including a first gluing region 330 near the tip 310. A second gluing region 332 is positioned further from the tip 310, a third gluing region 334 and a fourth gluing region 336 are positioned even further from the tip 310. In one embodiment, the first and second gluing regions are always utilized, but the third and fourth gluing regions are selectively utilized; i.e., either the third gluing region or the further gluing region is utilized, but not both. Selective utilization is useful to prevent the glue dots in adjacent suspension assemblies on a single load arm from interfering with each other and causing problems in assembly. Selective utilization is useful in the preferred embodiment, because two suspension assemblies are positioned between adjacent disks (such as shown in FIG. 1). For certain designs, the gluing regions may be provided on the lower surface, or both surfaces, of the load beam.

Figure 4:
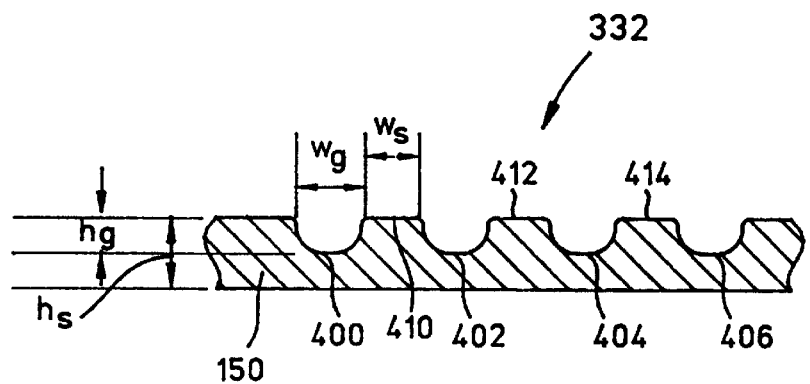
FIG. 4 is a cross section of the parallel grooves in the load beam shown in FIG. 3, illustrating the depth and width of etching.

Reference is now made to FIG. 4 which illustrates a cross section of the grooves of the second gluing region 332. However, it should be apparent that the cross section also applies to the other gluing regions 330, 334 and 336. The grooves illustrated in FIG. 4 include a first groove 400, a second groove 402, a third groove 404 and a fourth groove 406. Between the first and second groove is a first land portion 410, between the third and fourth grooves is a second land portion 412 and between the third and fourth grooves is a third land portion 414. The width of the first groove 400 is $w_g$, and the width of the first land portion 410 adjacent thereto is $w_s$. Preferably, the width $w_g$ is equal to that of $w_s$ and therefore, in gluing region 332, there is approximately a 50/50 distribution between the surface area associated with each groove and the surface area associated with the adjacent land.

The height of each groove, illustrated as $h_g$, is approximately 50 percent of the thickness of the load beam, illustrated as $h_c$. The thickness in one embodiment of a load beam is 0.0635 millimeters and in another embodiment it may be 0.076 millimeters. It should be understood that the above dimensions and relationships are approximate. Due to the nature of the manufacturing process in which etching is utilized, the dimensions on a manufactured part may vary somewhat but still be acceptable. For example, a 60/40 ratio may be acceptable.

Figure 5:
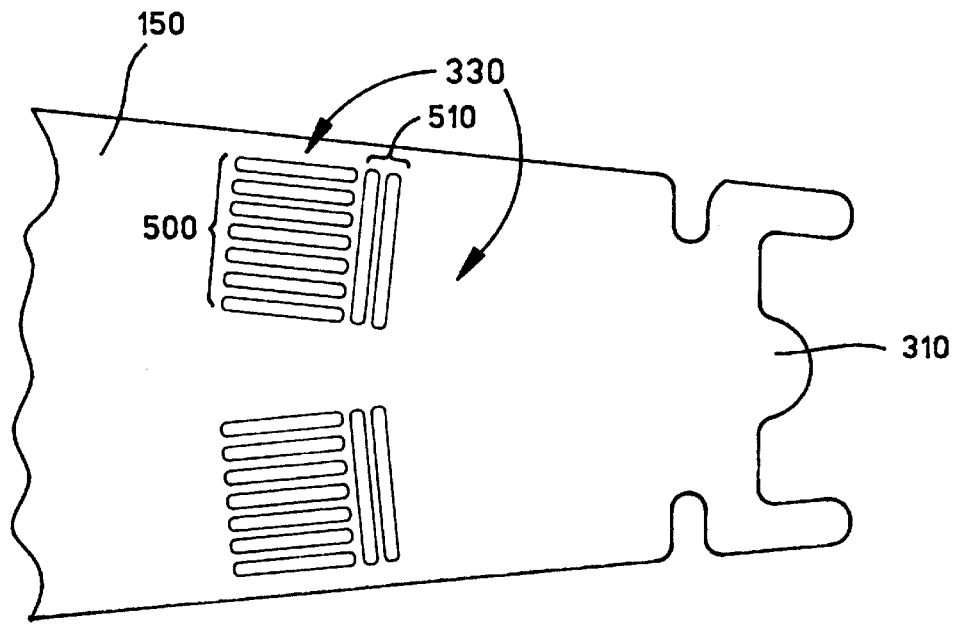
FIG. 5 is an enlarged top view of the tip of the load beam of FIG. 3.

FIG. 5 is an enlarged view of the tip section 310 of the load beam 150. The gluing region, illustrated generally at 330 includes a first set of parallel grooves 500 and a second set of parallel grooves 510. The first set of grooves aligned in the direction of the wire that will eventually be glued to it. The second set 510 is positioned approximately perpendicular, and at the end of one side of the first set 500. The second set 510 is positioned adjacent and crosswise to the first set 500 so that an obstacle is presented to glue flowing along each of the grooves in the first set 500. In other words, when the glue dot is applied to the gluing region 330, the glue will tend to flow along the grooves 500 in a direction including that towards the second set 510. The second set 510 will act as a stop and prevent further glue flowing beyond its edges. An advantage of positioning the second set of grooves in this manner is that glue is prevented from flowing into a region (particularly the tip) in which could adversely affect the stiffness characteristics of the wires in the critical tip region 310.

Figure 6:
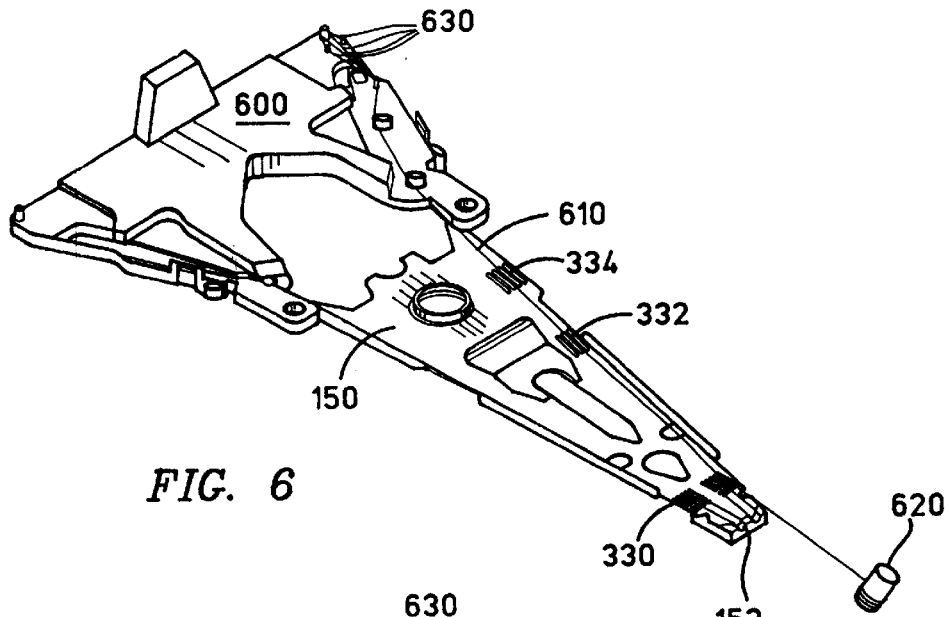
FIG. 6 depicts a load beam installed in a plastic tail and a wire bundle coupled to the tail and pulled across the load beam by a tensioner.

FIG. 6 illustrates a load beam 150 attached to a tail assembly 600 which is used for purposes including stringing wires. A tail assembly, and a method of stringing of wires is disclosed in detail in U.S. Pat. No. 5,074,029 to Brooks, Jr. et al. entitled "Method for Stringing Wire on an Actuator Arm", which is expressly incorporated by reference herein. To string the wire, the load beam 150 and the attached tail 600 is affixed to a tooling assembly (not shown). The wire bundle 610 is strung from the tail across the load beam 150 to a tensioning device 620. The wire bundle 610 includes four wires 630. The wires are positioned and tensioned using the tensioning device 620.

Figure 7:
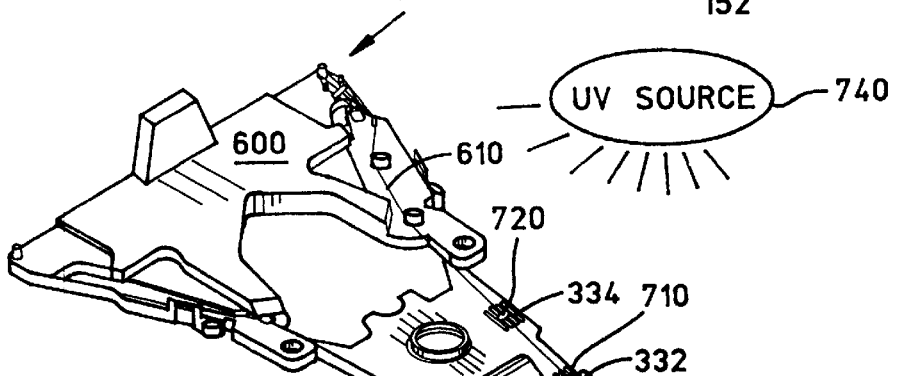
FIG. 7 is an illustration of the load beam, plastic tail, and wires of FIG. 6, adding the glue dots and a uv source used for curing the glue dots.

As illustrated in FIG. 7, glue dots are used to affix the wire bundle 610 to each gluing region. Particularly, a glue dot 700 is used to affix the wire bundle 610 to the first gluing region 330, a second glue dot 710 is used to affix the wire 610 to the second gluing region 332, and a third glue dot 720 is utilized to affix the wire 610 to the third gluing region 334.

After the glue dots have all been applied, a uv source 740 is energized in order to cure the uv sensitive glue. Preferably, the glue comprises Emcast 1728ETG uv curable adhesive available from Electronic Materials, Inc. of Brookfield, Conn. Any other suitable adhesive (uv curable or otherwise) could be utilized.

Figure 8:
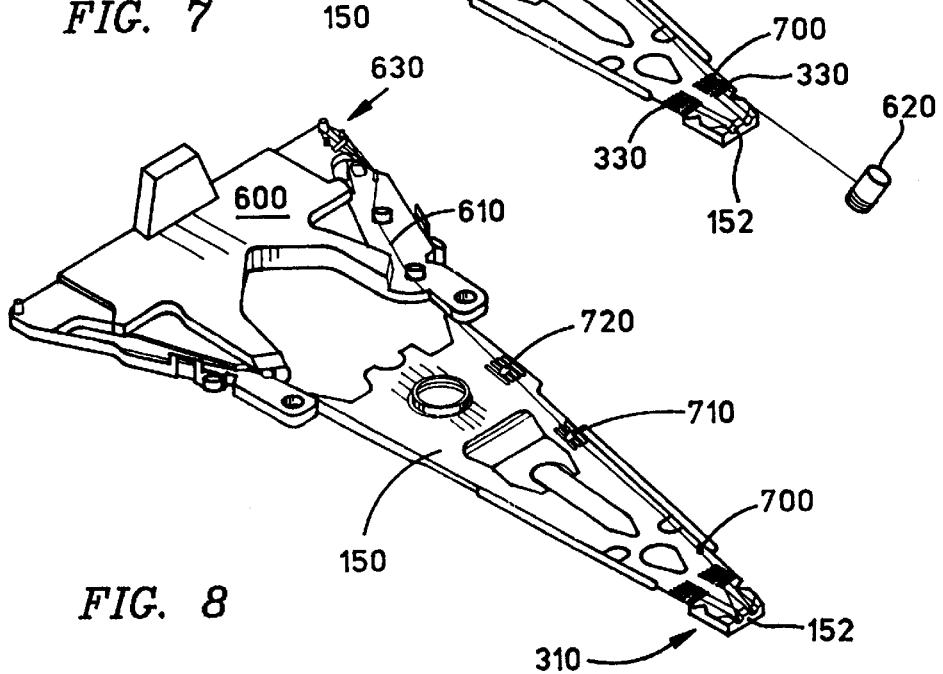
FIG. 8 depicts a completed load beam, illustrating the wires after being cut and coupled to the transducer head.

FIG. 8 illustrates a completed load beam and transducer head assembly in which the wire bundle 610 has been cut near the tip section 310. The wires in the wire bundle 610 have been individually ultrasonically bonded to the transducer head 152.

Figure 9:
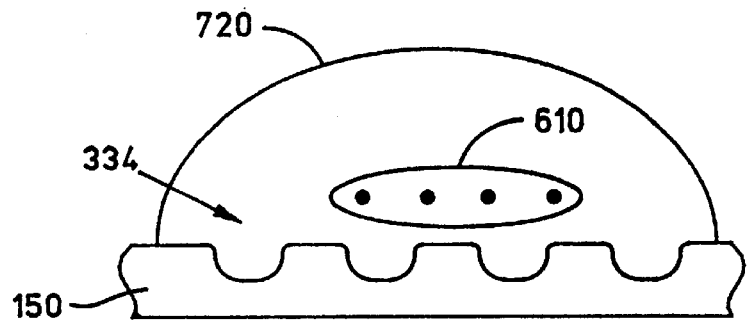
FIG. 9 is a cross-section of a glue dot shown in FIGS. 7 and 8, illustrating the coupling between the glue dot, the groove, and showing the wires passing through in cross-section.

FIG. 9 is a cross section of the glue dot 720 affixed to the third gluing region 334 in the load beam 150. It can be seen that the glue has flowed into each groove, thereby providing a good adhesive bond while holding the wire bundle 610 in position.

Figure 10:
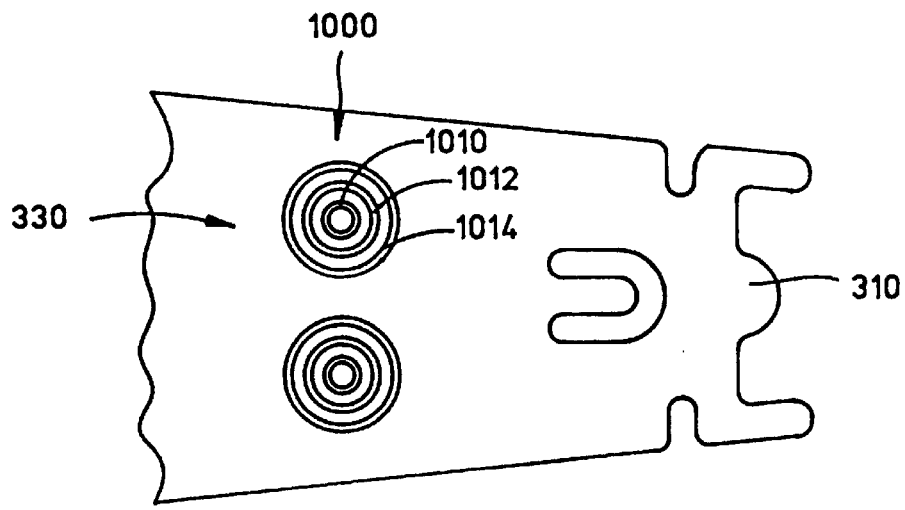
FIG. 10 is an alternative configuration of the gluing region, comprising a series of concentric circular grooves.

FIG. 10 is a diagram illustrating an alternate embodiment of a gluing region near the tip 310. As illustrated, the gluing region 330 includes a series of concentric circles illustrated at 1000, including a first circular groove 1010, a second circular groove 1012 and a third circular groove 1014. Of course, a greater or lesser number of grooves may be utilized, depending upon design considerations.

Figure 11:
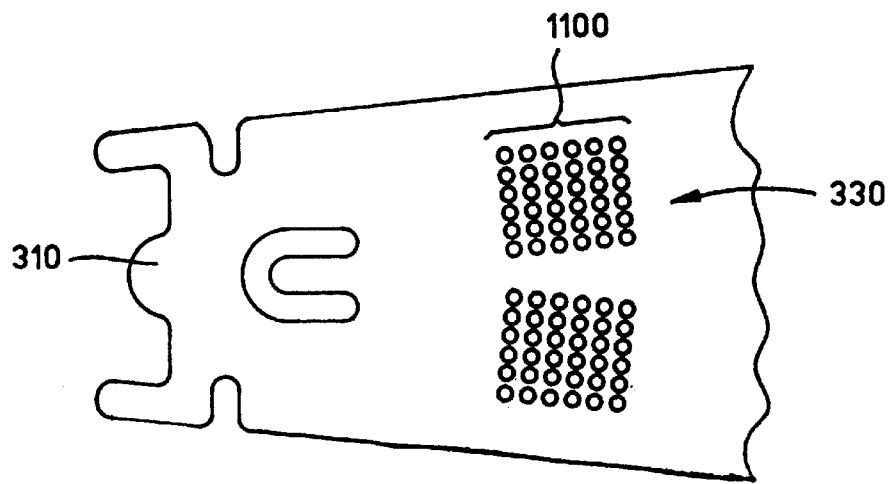
FIG. 11 is still another configuration of the gluing region, comprising a plurality of dimples.

FIG. 11 illustrates still another embodiment of a gluing region 330. As illustrated, a series of dots or "dimples" are formed as illustrated at 1100.

Figure 12:
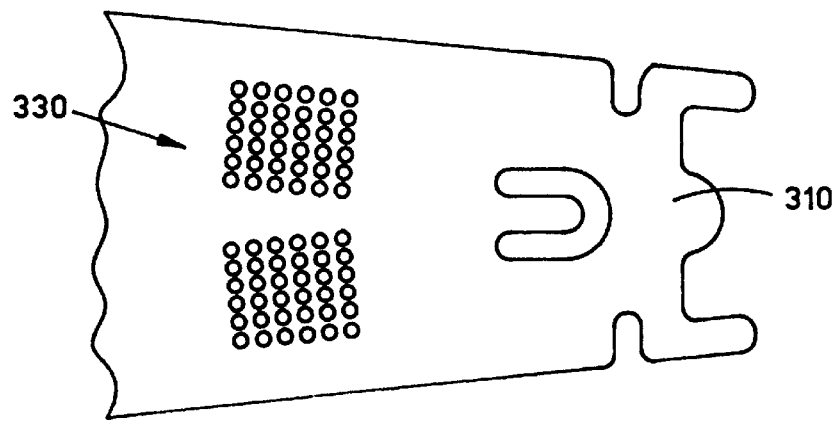
FIG. 12 is another configuration of the gluing region, comprising a plurality of intersecting grooves to form a mesh pattern including a plurality of islands.

Still another embodiment is illustrated at FIG. 12. The gluing region 330 therein includes a plurality of grooves intersecting and perpendicular to each, so that a plurality of islands are formed therein.

The preferred embodiment includes the plurality of parallel grooves illustrated, for example, in FIG. 5. Several design considerations make that the preferred embodiment: ease of manufacture, structural integrity (at least in one direction) and glue adhesion.

First, the grooved configuration is easy to specify and simple to manufacture at little additional cost by etching the grooves at the same time that the load beam is formed by etching. Particularly, using the grooves, it is relatively easy to obtain a predictable land/groove ratio (see FIG. 4 for discussion defining the land and groove areas). The grooves as illustrated in, for example, FIG. 5 are easier to manufacture utilizing the preferred etching process while still maintaining a desired ratio between the groove to land area in the gluing region. The concentric circles configuration of FIG. 10, the dimples of FIG. 11, and the cross-hatched pattern of FIG. 12 all are more difficult to manufacture reliably. In summary, the grooves are easier to specify and to reliably manufacture.

A second important issue is the structural effect of each gluing region. Each configuration of the gluing region affects structural characteristics. The cross-hatched gluing region of FIG. 12 and the concentric circles of FIG. 10 are particularly weak in all directions due to disruption of the structure along any axis. The grooves are strong in a direction parallel to the grooves, but are not as strong in a direction perpendicular to the grooves. The dimpled configuration 1100 of FIG. 11 is strong in both directions.

A third important consideration is obtaining a proper bond between the glue and the gluing region. It is difficult to obtain a strong bond between the glue and the dimpled region 1110 because, it is believed, that the dimples can hold air bubbles that prevent the glue from completely covering the surface area within the dimple. These bubbles therefore undermine adhesion between the glue dot and the gluing region. The grooved configuration, as well as the other configurations, allow the glue to flow along the grooves, preventing formation of bubbles and promoting a good adhesive seal between the glue dot and the gluing region. Therefore, the grooved configuration is preferred for reasons including ease of manufacture, strength in at least one direction, and promotion of good adhesion.

Figure 13:
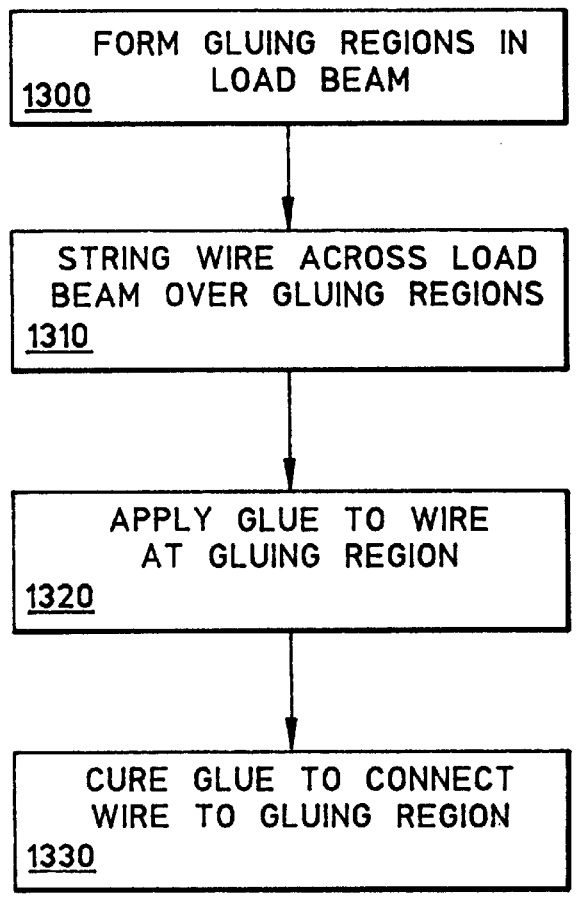
FIG. 13 is a flow chart illustrating a process for manufacturing a head suspension assembly using gluing regions on the load beam.

Reference is now made to FIG. 13 which is a flow chart illustrating a method for manufacturing a head suspension assembly using gluing regions on the load beam. As illustrated at 300, gluing regions are first formed in the load beam. These gluing regions may be performed by conventional means, or preferably using the partial etching method described subsequently with reference to FIG. 14. At 1310, wire is strung across the load beam over the defined gluing regions. One preferred method of stringing wires is disclosed in detail in U.S. Pat. No. 5,074,029 to Brooks, Jr. et al., discussed previously. At 1320, glue is applied to the wire at the gluing region. Then, at 1330, the glue is cured to connect the wire to the gluing region. If the glue is uv curable, as in the preferred embodiment, then the uv light is applied at this step.

Figure 14:
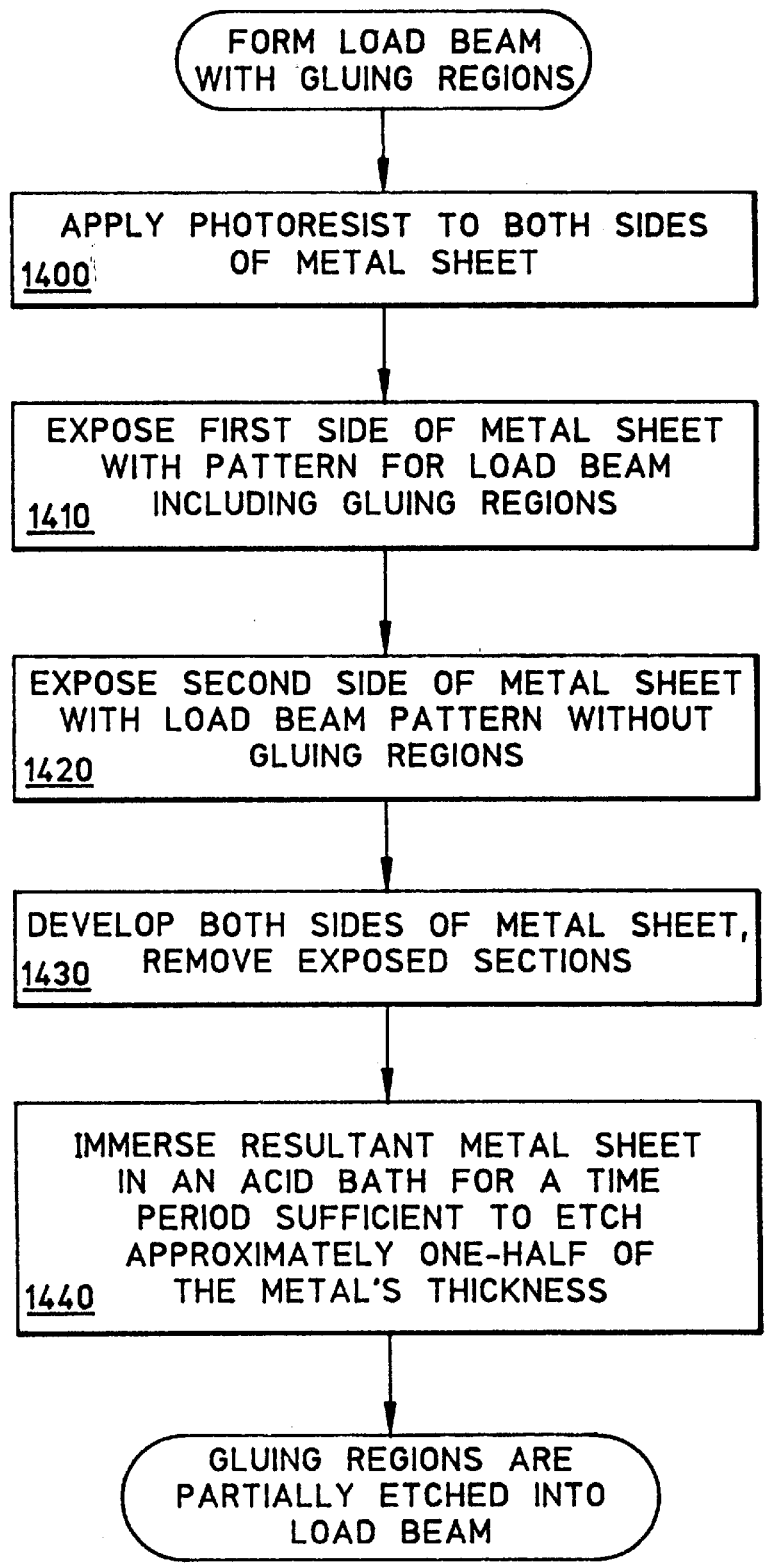
FIG. 14 is a flow chart of a process for forming the gluing regions by partial etching.

Reference is now made to FIG. 14 to show a flow chart of the preferred method of forming the gluing region. The grooves in the gluing regions are preferably photolithographically etched into the load beam using conventional techniques such as described in U.S. Pat. No. 5,353,181, to Frater et al. The gluing regions, as well as other features, are formed at the same time that the load beam is etched from a sheet of metal. In the etching process, as illustrated beginning at 1400, a sheet of metal from which the load beam is to be made is coated with photoresist. Then at 1410, the photoresist is exposed on one side with a light pattern corresponding to the gluing regions. As illustrated at 1410 and 1420, both sides are illuminated with a light pattern having the desired shape for the load beam. At 1430, the photoresist is developed and the exposed sections are removed. At 1440, the sheet is then placed in an acid bath for a period of time sufficient for the acid to etch away one-half of the thickness of the sheet from each side. Thus the grooves in the gluing region, which was exposed only on one side, are half-etched to a depth of approximately one-half of the thickness of the material, while the load beam, which was exposed on both sides, is completely detached from the remainder of the metal sheet. In the preferred embodiment, the grooves have a depth approximately 50 percent. Alternately, the grooves may be made separately to any desired depth. In some embodiments, the gluing region could be formed by conventional processes other than etching; however, the cost benefits of etching would not be realized.

Other embodiments and modifications of this invention may occur to those of ordinary skill in the art in view of these teachings. Therefore, this invention is to be limited only by the following claims, which include all such embodiments and modifications when viewed in conjunction with the above specification and accompanying drawings.

We claim:

1. A method for attaching a wire to a load beam in a head suspension assembly for a disk drive unit, comprising the steps of:

a) forming a plurality of grooves that define at least one gluing region on said load beam in the head suspension assembly for the disk drive unit;

b) positioning said wire so that a portion of said wire is adjacent to said at least one gluing region;

c) applying glue to said at least one gluing region on the load beam in the head suspension assembly for the disk drive unit and said wire adjacent thereto; and d) curing said glue to adhesively connect said wire to said gluing region.

2. The method of claim 1 wherein said step of forming a plurality of grooves includes forming a plurality of parallel grooves and at least one gluing region on the load beam in the head suspension assembly for the disk drive unit.

3. A method of forming a gluing region on a load beam for a head suspension assembly for a disk drive unit, comprising the steps of:

a) applying photoresist to both sides of a metal sheet;

b) exposing a first side of the metal sheet with a pattern including the outline of the load beam and predefined gluing regions;

c) exposing a second side of the metal sheet with the outline of the load beam but not the gluing regions;

d) developing said photoresist and removing the exposed sections; and e) placing the resulting product from said step d) into an acid bath for a period of time sufficient to actuate approximately one-half of the thickness of the metal sheet.

* * * * *